E. R. KELNER.
INSTRUMENT ADAPTED TO INDICATE THE LONGITUDINAL AND LATERAL INCLINATION
OF AIRPLANES.
APPLICATION FILED JAN. 13, 1919.

1,359,711.

Patented Nov. 23, 1920.

Inventor:
Eugene R. Kelner,
by John E. Stryker
Attorney.

UNITED STATES PATENT OFFICE.

EUGENE R. KELNER, OF MINNEAPOLIS, MINNESOTA.

INSTRUMENT ADAPTED TO INDICATE THE LONGITUDINAL AND LATERAL INCLINATION OF AIRPLANES.

1,359,711.     Specification of Letters Patent.     Patented Nov. 23, 1920.

Application filed January 13, 1919. Serial No. 270,778.

*To all whom it may concern:*

Be it known that I, EUGENE R. KELNER, a citizen of the United States, residing at Minneapolis, in the county of Hennepin and State of Minnesota, have invented an Instrument Adapted to Indicate the Longitudinal and Lateral Inclination of Airplanes, of which the following is a specification.

My invention relates to instruments adapted to indicate the longitudinal and lateral inclination of airplanes.

Its object is to provide an indicator which will constantly and accurately advise the pilot of the degree of inclination of his plane both longitudinally and laterally.

More specifically, its object is to improve upon the instrument illustrated and described in my application for patent, filed November 4th, 1918, and bearing Serial Number 261,108.

By the present improvements, I minimize friction on the moving parts of the instrument and also reduce oscillations of these parts after abrupt changes of level of the plane.

Figure 1:
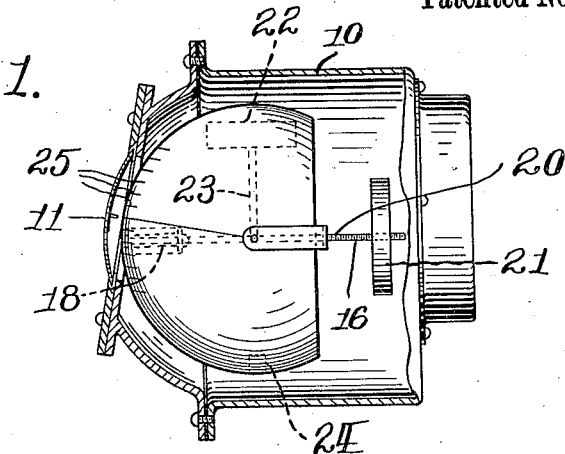
Figure 2:
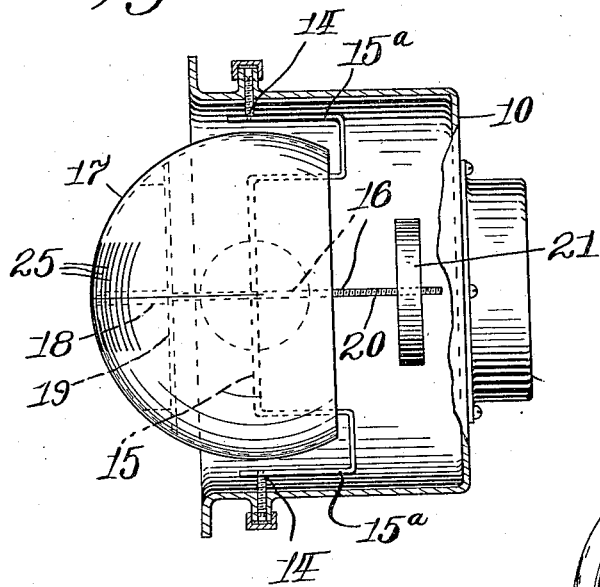
Figure 3:
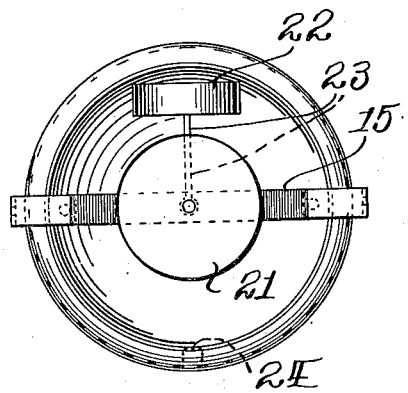
Figure 4:
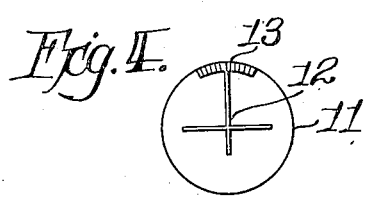

In the drawings, Figure 1 is a side elevation of my instrument with the outer casing broken away; Fig. 2 is a plan view of the instrument with the front of the case removed and the side wall broken away; Fig. 3 is a rear view of the inner sphere with connected parts; and Fig. 4 is a plan of the sight glass with its lubber lines and scale.

The outer case 10, which is substantially identical with that of my former application (Serial Number 261,108) is filled with non-freezing fluid and is provided with the sight glass or lens 11 upon or beneath which lubber lines 12 and an arcuate scale 13 may be displayed. This case 10 is adapted to be fixed to the instrument board of the airplane in convenient position for the constant observation of the sight glass by the pilot. Upon pintles 14, in the sides of the case 10, a balance arm or swing 15 is pivotally mounted. To the center of this balance arm the rod 16 is rigidly attached at right angles. Upon the rod 16 an indicator shell 17, which is formed like a truncated sphere, is centrally journaled by means of the tubular bearing 18 attached to the inner periphery of the shell 17. A brace 19, attached at its ends to the shell 17, is fixed to the inner end of the tubular bearing 18 to hold the bearing rigidly in position. The balance arm 15 is formed with a U-shaped bend 15$^a$ near each end which give clearance for the edges of the shell 17 in the movement of the shell relative to the balance arm upon the rod 16. The inner end of the rod 16 is formed with threads 20 upon which a counter weight 21 may be adjusted to balance the weight of the shell 17. A float 22, located within the shell, is attached by means of a rod 23 to the balance arm 15 and the weight 24 is fixed in the predetermined base of the shell. The interior of the shell 17 is of course filled with the non-freezing liquid contained in the case. The immersion of the shell in this liquid together with the buoyant effect of the float result in practically eliminating friction in the bearings of the balance arm 15 as well as in the bearing of the rod 16 in tube 18. The combined effect of the weight 24 and float 22 is to hold the central convex surface of the shell in normal position under the sight glass 11. This portion of the shell beneath the sight glass is provided with a graduated scale 25 adapted in coöperation with the lubber lines 12 and arcuate scale 13 to register the lateral and longitudinal inclination of the case 10, which is of course the same as that of the plane with reference to the registering shell 17; it being obvious that any inclination of the plane longitudinally will result in a corresponding tilting of the case 10 upon the pintles 14, while a lateral inclination of the airplane will cause a corresponding lateral tilting of the case 10 relative to the shell 17 by reason of the movement of the rod 16 in the bearing 18.

Having described my invention what I claim as new and desire to protect by Letters Patent is:

1. An instrument for indicating lateral and longitudinal inclination of an airplane comprising an outer case provided with a sight glass, a balance arm journaled at its ends in said case, a spherical shell open at one side and provided with a bearing opposite said open side, a rod fixed at right angles upon said balance arm, one end of said rod being journaled in said bearing, a counter weight threaded on the opposite end of said rod, and a float attached to said balance arm, the convex face of said shell and the sight glass having scales thereon adapted to register with each other.

2. An instrument for indicating lateral and longitudinal inclination of an airplane comprising an outer case provided with a sight glass and adapted to retain liquid, a non-freezing fluid within said case, a balance arm journaled at its ends in said case, a hollow shell open at one side and arranged to present its closed surface to said sight glass, a rod fixed at right angles upon said balance arm, one end of said rod being journaled in said shell, a counter weight threaded on the opposite end of said rod, a float attached to said balance arm and graduated scales upon the convex face of said shell and upon said sight glass, adapted to register one with the other.

3. An instrument for indicating lateral and longitudinal inclination of an airplane comprising an outer case provided with a sight glass and adapted to retain liquid, a balance arm journaled at its ends in said case, a spherical shell open at one side and arranged to present its convex surface to said sight glass, a rod fixed at right angles upon said balance arm, one end of said rod being journaled in the center of said shell, a float attached to and above said balance arm, a non-freezing liquid within said case and shell, and indicator lines upon the convex face of said shell and upon said sight glass adapted to register with each other.

4. An instrument for indicating lateral and longitudinal inclination of an airplane comprising an outer case provided with a sight glass and adapted to retain liquid, a non-freezing mixture within said case, a transverse balance arm journaled at its ends in said case, a spherical shell cut away at one side and arranged to present its convex surface to said sight glass, a rod fixed at right angles upon said balance arm, one end of said rod being provided with a journal bearing in the center of said shell, an adjustable counter weight on the opposite end of said rod, a float attached to said balance arm, and indicator lines upon the convex face of said shell and upon said sight glass adapted to register with each other.

5. An instrument for indicating lateral and longitudinal inclination of an airplane comprising an outer casing provided with a sight glass, a balance arm journaled at its ends in said case, a spherical shell open at one side and arranged to present its opposite convex side to said sight glass, a rod fixed at right angles upon said balance arm, one end of said rod being provided with a journal bearing in the center of said shell, a counter weight on the opposite end of said rod, bends formed in said balance arm to provide clearance for the edges of the shell, and a float attached to said balance arm.

Whereof, I have hereunto subscribed my name to this specification.

EUGENE R. KELNER.